United States Patent [19]

Taira et al.

[11] Patent Number: 5,247,525
[45] Date of Patent: Sep. 21, 1993

[54] TEST CIRCUIT WITH SIGNATURE REGISTER AND AN ADDITIONAL REGISTER

[75] Inventors: Takunori Taira; Jiro Korematsu, both of Itami, Japan

[73] Assignee: Mitsubishi Denki Kabushiki Kaisha, Tokyo, Japan

[21] Appl. No.: 609,302

[22] Filed: Nov. 1, 1990

[30] Foreign Application Priority Data

Nov. 14, 1989 [JP] Japan ................................. 1-296811

[51] Int. Cl.$^5$ ............................................. G01R 31/28
[52] U.S. Cl. ................................. 371/22.4; 371/22.1
[58] Field of Search .................... 371/22.3, 22.4, 22.1; 324/158 R

[56] References Cited

U.S. PATENT DOCUMENTS 4,519,078  5/1985  Komonytsky ..................... 371/22.3
4,594,711  6/1986  Thatte ................................ 371/22.4
4,701,916  10/1987  Naven et al. ..................... 371/22.4

OTHER PUBLICATIONS

IEEE SC-15 No. 3, Jun. 1990, pp. 315-319.
Int. Test Conf., 1980; pp. 261-266.
Intl. Test Conf., 1981, pp. 15-20.
Intl. Solid-State Circuits Conf., Feb. 1982, pp. 60-61.
IEEE Test Conf., 1981, pp. 208-216.
IEEE C-29 No. 6, 1980, pp. 510-514.
IEEE Test Conf., 1986, pp. 282-288.
IEEE Test Conf., 1987, pp. 645-655.

*Primary Examiner*—Charles E. Atkinson
*Attorney, Agent, or Firm*—Townsend and Townsend Khourie and Crew

[57] ABSTRACT

A test circuit which utilizes a multi-bit impact signature register and an additional register coupled to the output of the signature register and configured as a linear feedback multi-stage shift register. The total number of stages in the two registers is larger than the width of the test data (number of bits) to be input. A single feedback loop couples the output of the last additional register stage back to the first stage of the signature register. Each bit of the test data is input to an exclusive-or element at the input to each stage of the shift register and is exclusive-or-operated sequentially with the result of an exclusive-or operation stored in the preceding stage, and the result of the operation in the last stage is fed from the additional register back to the first-stage exclusive-or- element of the signature register with a delay. Only one additional register having one or more stages is required for the hardware configuration while providing an error detecting rate of the same degree as the case of using a primitive polynomial, simplifying the actual circuit configuration, and reducing the occupying area on the chip.

8 Claims, 7 Drawing Sheets

Fig. 4

| m \ y | 1 | 2 | 3 | 4 | 5 | 6 | 7 | |
|---|---|---|---|---|---|---|---|---|
| \multicolumn{8}{l}{t: NUMBER OF p TO BE OPERATED BY NOT-IF-THEN OPERATION} | |
| 1 | 1 | 1 | 1 | 1 | 1 | 1 | 0 | |
| 2 | 1 | 2 | 2 | 2 | 2 | 2 | 1 | |
| 3 | 2 | 2 | 3 | 3 | 3 | 3 | 2 | |
| 4 | 3 | 3 | 3 | 4 | 4 | 4 | 3 | |
| 5 | 4 | 4 | 4 | 4 | 5 | 5 | 4 | |
| 6 | 5 | 5 | 5 | 5 | 5 | 6 | 5 | |
| 7 | 6 | 6 | 6 | 6 | 6 | 6 | 6 | → ALL RESULTS BECOME "6" |
| 8 | 7 | 7 | 7 | 7 | 7 | 7 | 6 | |
| 9 | 7 | 8 | 8 | 8 | 8 | 8 | 7 | |
| 10 | 8 | 8 | 9 | 9 | 9 | 9 | 8 | |
| 11 | 9 | 9 | 9 | 10 | 10 | 10 | 9 | |
| 12 | 10 | 10 | 10 | 10 | 11 | 11 | 10 | |
| 13 | 11 | 11 | 11 | 11 | 11 | 12 | 11 | |
| 14 | 12 | 12 | 12 | 12 | 12 | 12 | 12 | → ALL RESULTS BECOME "12" |
| 15 | 13 | 13 | 13 | 13 | 13 | 13 | 12 | |
| 16 | 13 | 14 | 14 | 14 | 14 | 14 | 13 | |
| 17 | 14 | 14 | 15 | 15 | 15 | 15 | 14 | |
| 18 | 15 | 15 | 15 | 16 | 16 | 16 | 15 | |
| 19 | 16 | 16 | 16 | 16 | 17 | 17 | 16 | |
| 20 | 17 | 17 | 17 | 17 | 17 | 18 | 17 | | y: REGISTER NUMBER
m: TEST SEQUENCE

TEST CIRCUIT WITH SIGNATURE REGISTER AND AN ADDITIONAL REGISTER

BACKGROUND OF THE INVENTION

1. Field of the Invention

The present invention relates to a test circuit for a microprocessor or the like, and more specifically, relates to a test circuit having a signature register.

2. Description of Related Art

FIG. 1 is a schematic diagram showing an example of the conventional circuit configuration of a multi-input signature register.

In FIG. 1, numeral 1 designates signal lines, numeral 2 designates exclusive-or elements, numeral 3 designates registers, numeral 4 designates feedback taps, numeral 5 designates signature output terminals for outputting a test result, and numeral 6 designates an input terminal of a clock CLK.

The number of the signal lines 1 is $n(1_0$ through $1_{n-1})$ corresponding to the number of bits n of a test data $I(x)$, and each of them is connected to one input of each of the exclusive-or elements $2(2_0$ through $2_{n-1})$. Also, outputs of the respective exclusive-or elements $2_0$ through $2_{n-1}$ are inputted to the registers $3_0$ through $3_{n-1}$ of $D_0$ through $D_{n-1}$.

Outputs of the registers $3_0$ through $3_{n-1}$ ($D_0$ through $D_{n-1}$) are connected to the feedback taps $4_{n-1}$ through $4_0$ ($P_{n-1}$ through $P_0$) and inputs of the next-stage exclusive-or elements $2'_{n-1}$ through $2'_1$, and become the test result output lines $5_0$ through $5_{n-1}$ of a signature output of n bits $S(x)$, respectively.

Each output of the feedback taps $4_{n-1}$ through $4_1$ ($P_{n-1}$ through $P_1$) is connected to one input of each of the exclusive-or elements $2'_{n-1}$ through $2'_1$, and to the other input of each of the exclusive-or elements $2'_{n-1}$ through $2'_2$, each of the next-stage exclusive-or elements $2'_{n-2}$ through $2'_1$ is connected in a feedback manner (note that the output of the feedback tap $4_0$ ($P_0$) is connected to $2'_1$). Then, the output of the exclusive-or element $2'_{n-1}$ whereto the output of the feedback tap $4_{n-1}(P_{n-1})$ is inputted is connected to the other input of the exclusive-or element $2_0$ giving an output to the register $3_0(D_0)$.

Also, an output string $Y(x)$ of the last-stage register $3_{n-1}(D_{n-1})$ is coupled to the feedback tap $4_0(P_0)$, and becomes the test result output line $5_{n-1}$.

In addition, each of the registers $3_0$ through $3_{n-1}$ is configured as a flip-flop synchronized with the clock CLK input to the clock input terminal 6. Then, as to the presence or absence of a feedback loop from each of the registers $3_0$ through $3_{n-1}$, when a set value $p_j$ (i=0 through n-1) of each of the feedback taps $4_{n-1}$ through $4_0$($P_{n-1}$ through $P_0$) is "1", connection is made and a feedback loop is configured, and when the set value is "0", no connection is made and no feedback loop is configured.

In addition, in the case of $p_j$="0", the exclusive-or elements $2'_{n-1}$ through $2'_1$, to which the outputs of the feedback taps $4_{n-0}$ through $4_0$ are coupled, are not required.

FIG. 2 illustrates a single-input signature register as contrated with the signature register having an n-bit input shown in FIG. 1, but both are the same in principle.

A test data $1(I(x))$ coupled as an input to the single-input signature register shown in FIG. 2 is input to the exclusive-or element $2_0$ in synchronism with the clock 6 (CLK). Then, it is sequentially operated on using the exclusive-or elements 2; and the flipflops 3;, with the result of each operation being transferred to the next-stage flip-flop 3.

FIG. 2 shows a circuit wherein a division by the following characteristic polynomial is executed.

$$P(x)=x^n+P_{n-1}x^{n-1}+ \ldots +P_2x^2+p_1x+p_0 \quad (1)$$

Here, when the value of pj is "1", the connected state is represented, and when the value is "0", the non-connected state is represented, respectively.

The test data $I(x)$ as shown by the following equation (2) is inputted sequentially from a higher-order term to such a circuit.

$$I(x)=i_mx^m+ \ldots +i_2x^2+i_1x+i_0 \quad (2)$$

When the original input term first reaches the flip-flop $3_{n-1}(D_{n-1})$ (when it becomes "1"), feedback is applied according to the value of $P_{n-1}$ through $P_0$ set in each feedback tap 4.

This means that the circuit shown in FIG. 2 performs the following operation.

Generation of $x^n \rightarrow$ $p_{n-1}x^{n-1} + \ldots + p_2x^2 + p_1x + p_0$ is subtracted (mod. 2).

Next, when the value of the register is shifted by one and $x^n$ appears, a subtraction is executed, and when $x^n$ does not appear, no subtraction is executed. Such an operation is a division, and it is understood that the circuit shown in FIG. 2 is a division circuit by means of a characteristic polynomial $P(x)$.

Accordingly, the output string $Y(x)$ is equivalent to a quotient $Q(x)$ of the test data $I(x)$ divided by $P(x)$, and a residue $R(x)$ thereof is held in each flip-flop 3.

$$I(x)=Q(x) \cdot P(x)+R(x) \quad (3)$$

$$Y(x)=Q(x) \quad (4)$$

Where, $$\text{Quotient:} Q(x)=q_{m-n}x^{m-n}+ \ldots +q_2x^2+q_1x+q_0 \quad (5)$$

$$\text{Residue: } R(x)=r_{n-1}x^{n-1}+ \ldots +r_2x^2+r_1x+r_0 \quad (6)$$

Consideration will now be made of the effect on the value of each flip-flop 3 (register value) when an error string $e(x)$ is contained in the test data $I(x)$.

The error string $e(x)$ is represented by the following equation.

$$e(x)=Qe(x) \cdot P(x)+Re(x) \quad (7)$$

Therefore, the test data containing an error is represented as follows.

$$I(x)+e(x)=(Q(x)+Qe(x)) \cdot P(x)+(R(x)+Re(x)) \quad (8)$$

Then, as the register value (signature $S(x)$) after the quotient $(Q(x)+Qe(x))$ has been output, the residual $(R(x)+Re(x))$ containing the error remains. By judging whether or not the signature $S(x)=R(x)$ holds from this, the error can be detected.

However, when e(x) is reducible by P(x), the signature becomes the same as the true value, and therefore the error is missed.

A similar problem exists also in the multi-input circuit shown in FIG. 1. In the FIG. 1 example, the test data has a width of n and a depth of m, and therefore data is input in parallel in synchronism with the clock CLK. Thereafter, the compressed data present as the test result on output lines 5 is compared with correct data, and the presence or absence of an error in the test data is determined.

Since the signature register compresses data for the purpose of reducing the testing time, this produces a high probability of missing an error in the process. This probability of missing an error is referred to as the error missing probability.

In the signature register having the conventional circuit configuration, a primitive polynomial is adopted as a characteristic polynomial to reduce the error missing probability. However, this increases the area occupied by the circuit in the case where an actual circuit is configured on a chip, and as described above, the feedback loop is required to be configured by disposing the exclusive-or elements at positions corresponding to the number of terms. As a consequence the positions of disposition of these elements become irregular, resulting in a complicated circuit design.

SUMMARY OF THE INVENTION

The present invention provides a test circuit which can suppress the error missing probability lower than $\frac{1}{2}^n$, where n is the number of bits of a test input signal. As an example, the invention affords an error detecting rate of 99.99847% or more in the case of n=16.

A test circuit in accordance with the present invention utilizes a so-called signature register configured as a linear feedback shift register; is provided with a number of registers larger than the width (number of bits) of test data to be input to the circuit and is provided with a feedback loop which feeds back only the output from the last register in the series.

In the test circuit of the present invention, each bit of the test data is input to an exclusive-or element associated to a corresponding stage of the shift register. Each shift register stage is coupled in sequence to the exclusive-or element in the next stage, and the result of the operation in the last stage is fed back with a delay from an additional register coupled to the output of the last stage to the first-stage exclusive-or element.

The above and further objects and features of the invention will more fully be apparent from the following detailed description with accompanying drawings.

BRIEF DESCRIPTION OF THE DRAWINGS

FIG. 4 is an illustrative table relating the number of register stages, the number of steps in a test sequence and the number of exclusive-or-operated probabilities of test data error for 6 bit input data.

DESCRIPTION OF THE PREFERRED EMBODIMENTS

Hereinafter, detailed description is made of the present invention based on drawings showing embodiments thereof.

In addition, in an embodiment detailed hereinafter, description is made principally of an example wherein the number of stages of registers is larger by one than the width of the test data to be input. It is noted that the present invention is applicable also to the case where the number of stages is larger by two or more.

Figure 1:
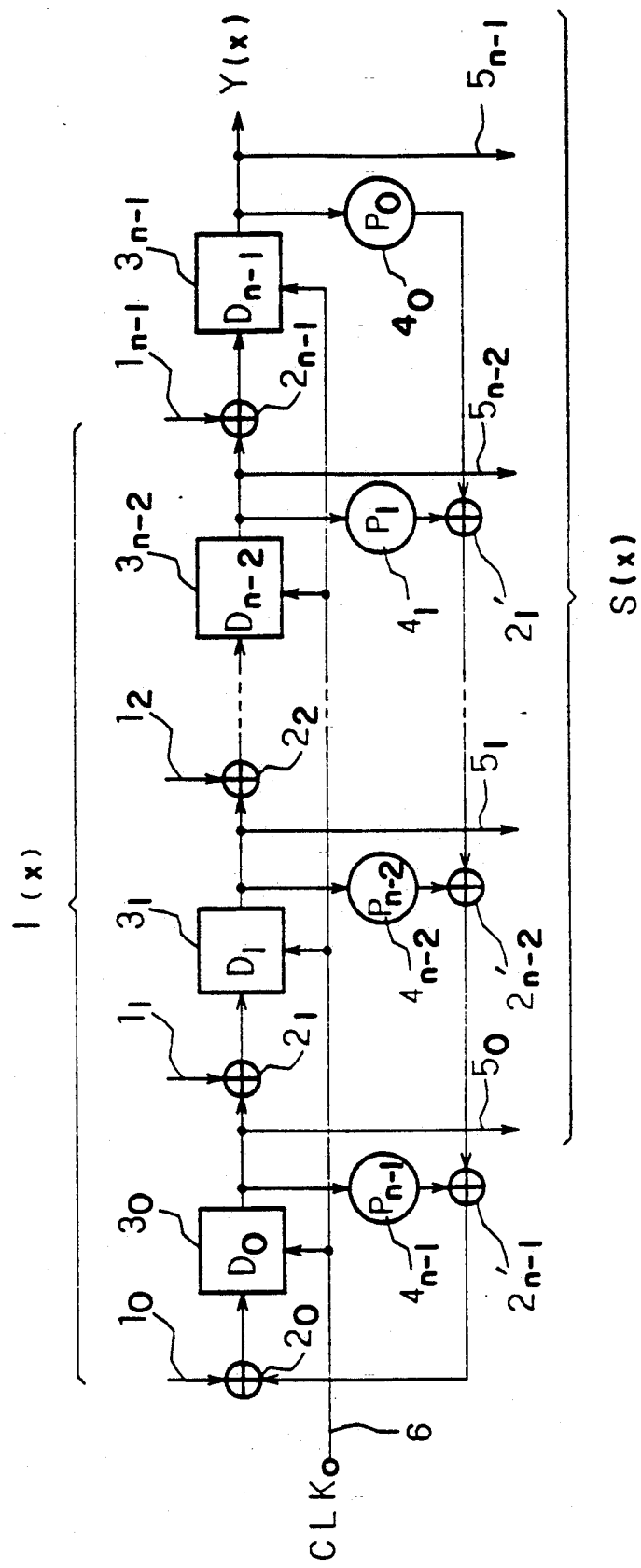
FIG. 1 is a circuit diagram showing a conventional general multi-input signature register.
Figure 2:
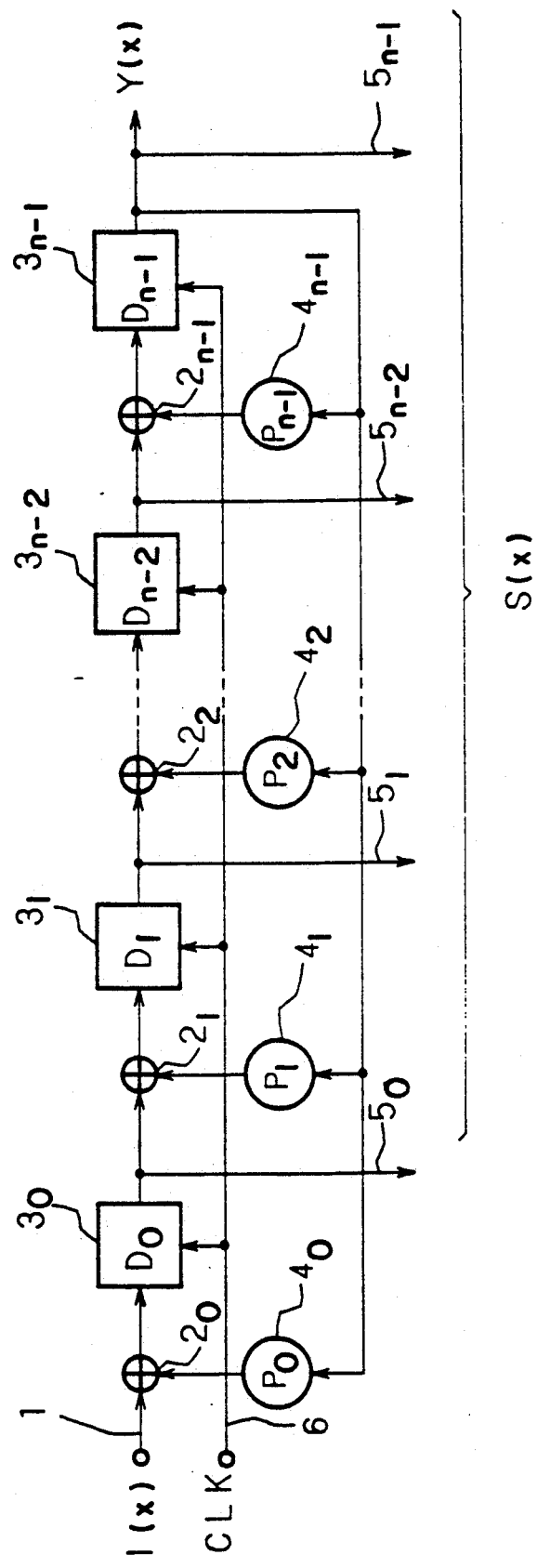
FIG. 2 is a circuit diagram showing a conventional general single-input signature register.
Figure 3:
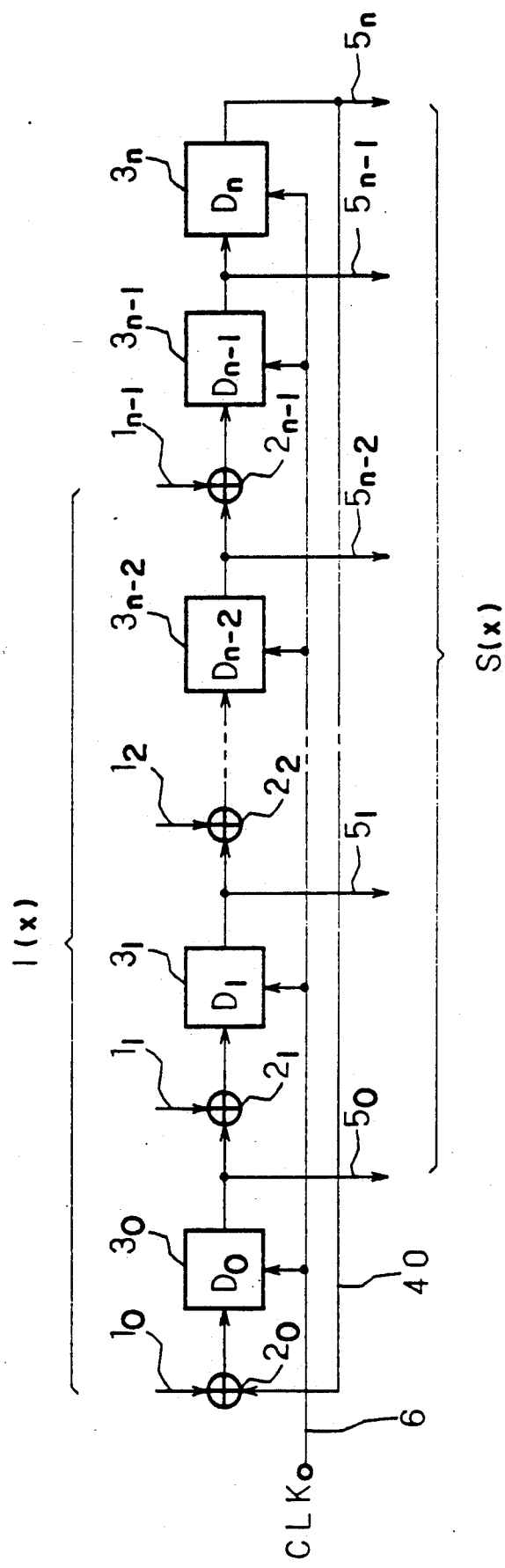
FIG. 3 is a circuit diagram showing a test circuit in accordance with the present invention.

FIG. 3 is a schematic diagram showing a configuration of a test circuit, that is, a signature register of the present invention.

In FIG. 3, numerals $1_0$ through $1_{n-1}$ designate signal lines to which respective bits of a test data I(x) are input.

Numerals $2_0$ through $2_{n-1}$ designate exclusive-or elements to one input of which each of the signal lines $1_0$ through $1_{n-1}$ is connected.

Numerals $3_0$ through $3_n$ designate registers, which are provided in a number n+1 in the circuit of the present invention. Each of the registers $3_0$ through $3_n$ is configured, respectively, with flip-flops $D_0$ through $D_n$, and the output of each of the exclusive-or elements $2_0$ through $2_{n-1}$ is coupled to the data input terminal of the adjacent register. Thus, each of the flip-flops $D_0$ through $D_{n-1}$ corresponds to each of the n number of signal lines $1_0$ through $1_{n-1}$, and additional flip-flop $D_n$ (register $3_n$) coupled to the data output of the flip-flop $D_{n-1}$ is also provided. The output of flip-flop $3_n$ is connected to the other input of the exclusive-or element $2_0$, the output of which is coupled to the input of first-stage flip-flop $D_0$ to provide a feedback loop 40.

Numerals $5_0$ through $5_n$ designate the signature output terminals for outputting the test results from the flip-flops $D_0$ through $D_n$, respectively.

Numeral 6 designates a clock input terminal to which the clock CLK is coupled, which supplies the clock CLK to the n+1 flip-flops $D_0$ through $D_n$. In the following description the quantity n+1= k.

Exclusive-or elements $2_0$ through $2_{n-1}$ and registers $3_0$ through $3_{n-1}$ comprise a first shift register, register $3_n$ comprises a second shift register, and the first and second shift registers form a multistage shift register. Each exclusive-or element $2_0$ (or $2_1$ through $2_{n-1}$) and each corresponding register $3_0$ (or $3_1$ through $3_{n-1}$) compromise each test data latch and each such test data latch corresponds to each stage of the first shift register. The register $3_n$ also comprises a test data latch (or dummy register) and corresponds to each stage (one stage in this embodiment) of the second register.

In addition, each stage (one stage in this embodiment) of the second shift register is considered to have an an exclusive-or element with one input permanently fixed to logical low level or is considered to be a dummy register which receives the output signal from the register in the preceding stage and samples this signal in synchronization with the clock signal.

A characteristic polynomial of the signature register having such a configuration is expressed by $(1+x^k)$ or $(1+x^{n+1})$.

Operation of the test circuit of the present invention shown in FIG. 3 is as follows.

In the circuit shown in FIG. 3, each of the flip-flops $D_0$ through $D_n$ starts from the all-ZERO state, and when an error exists, it becomes "1", and if the all-ZERO state is held after the test has been completed, it is judged that no error exists. Also, the case where a plurality of errors exist, resulting in that "1" is finally erased and the all-ZERO state is produced is referred to as "missing the error".

First, the case where all inputs are erroneous (p=1: p is the probability of an error contained in a test pattern) is equivalent with the case in which one input of each of the exclusive-or elements $2_0$ through $2_{n-1}$ is "1" all the time. For this reason, when the initial value is "0", the value of each of the flip-flops $D_0$ through $D_{n-1}$ becomes "0" in an even sequence.

On the other hand, in the case where the flip-flop $D_n$ is added after the last-stage flip-flop $D_{n-1}$, the case where all the exclusive-or elements $2_0$ through $2_{n-1}$ are put in the all-ZERO state takes place only when a shift is performed by the number of stages k of the flip-flops D. In other words, the error missing probability in the case of p = 1 becomes 1/k.

Next, consideration is made for the case of $0 < p < 1$.

Denoting a test data input to the i-th flip-flop $D_{i-1}$ at the point of a test sequence j as $S_{ij}$, and denoting the probability that an error is contained in the test data as p, since the initial state is all-ZERO, the probability that an error is contained in the test data $S_{io}$ in each flip-flop D at the point of the test sequence j=1 becomes as follows.

| | | |
|---|---|---|
| The first-stage flip-flop | $D_0$ | : $S_{11} = p$ |
| The second-stage flip-flop | $D_1$ | : $S_{12} = p$ |
| . | . | . . |
| . | . | . . |
| . | . | . . |
| The n-th-stage flip-flop | $D_n$ | : $S_{1n} = p$ |
| The (n + 1)-th-stage flip-flop | $D_{n+1}$ | : $S_{1(n+1)} = 0$ |

In the case of j=2, exclusive-or of the present input and the probability of the value of the shifted flip-flop becomes as follows when exclusive-or operation is expressed by $$"a \oplus b = a + b - 2ab".$$

$s_{21} = p \oplus s_{1(n+1)}$
$= p$ $s_{22} = p \oplus s_{11}$
$= p \oplus p$

.
.

$s_{2n} = p \oplus s_{1(n-1)}$
$= p \oplus p$ $s_{1(n+1)} = s_{1n}$
$= p$

Then, hereinafter this continues as follows.

$s_{31} = p \oplus s_{2(n+1)}$
$= p \oplus p$ $s_{32} = p \oplus s_{21}$
$= p \oplus p \oplus p$

.
.

$s_{3n} = p \oplus s_{2(n-1)}$
$= p \oplus p \oplus p$ $s_{2(n+1)} = s_{2n}$
$= p \oplus p$ On the other hand, paying attention to the i-th flip-flop, a probability $t_{im} (=1-s_{im})$ of the value becoming "0" at the point of a test sequence m is expressed as follows.

$t_{i1} = 1 - s_{i1} = 1 - p$
$t_{i2} = 1 - s_{i2} = 1 - p \oplus p = 1 - 2p + 2p^2$
$t_{i3} = 1 - s_{i3} = 1 - p \oplus p \oplus p = 1 - 3p + 6p^2 - 4p^3$
. .
. .
. .
$t_{im} = 1 - S_{im} = 1 - p \oplus p \ldots p \oplus p$
(the number of p is m)

A solution meeting the above-mentioned equation is given by the following equation. This means that the probability that the i-th flip-flop value at the point of the test sequence m is "0" is given by the following equation.

$$t_{im} = \frac{1 + (1 - 2p)^m}{2} \text{ (where } m \geq 1\text{)} \quad (9)$$

The above shows that if the number of p to be exclusive-or-operated is confirmed, the error missing probability of the whole signature register is confirmed.

Here, consideration is made with the case of n=6 taken as example. FIG. 4 shows a table of a number t of p to be exclusive-or-operated. In addition, m represents the test sequence, and y represents the position $(1 \geq y \geq 7)$ of the flip-flop D. From this table shown in FIG. 4, it is understood that the following relationship is obtained.

$$\left.\begin{array}{l} t = m - |m - y|/k \ : 1 \leq y \leq n \\ t = m - |m|/k \ \ y = k = n + 1 \end{array}\right] \quad (10)$$

This relationship holds also for an arbitrary number n.

An error missing probability Pal of the whole signature register is given as a product of the error missing probabilities of the individual registers, being expressed by the following equation.

$Pal$ = (missing probability of +1 register) × (11)
(missing probability of 1 − n registers) −
$(1 - p)^{mn}$ $= \frac{1 + (1 - 2p)^{m - m/k}}{2} \times$ $$\frac{\pi}{\substack{j=1}}^{n} \frac{1 + (1 - 2p)^{m-\ (m-j)/k}}{2}$$

$$(1 - p)^{mn}$$

$$= \frac{\pi}{\substack{j=0}}^{n} \frac{1 + (1 - 2p)^{m-\ (m-j)/k}}{2} -$$

$$(1 - p)^{mn} \text{ where } m \geq j$$

here,
- m: number of test vectors (sequence length of test data)
- n: number of inputs of signature register (width of test data)
- k: number of stages of signature register
- p: probability of error contained in test pattern Also, representing the exponential part of the numerator of Equation (11) by t, the following equation is obtained.

$$t = m - \left[ \frac{m - j}{k} \right] \tag{12}$$

Next, consideration is made on the case where the test sequence m is a multiple of the number of stages k of the register (m = αk).

$$j = 0: t = m - \frac{m}{k} = \alpha k - \frac{\alpha k}{k}$$
$$= \alpha(k - 1)$$

$$j = n: t = m - \frac{m}{k} = \alpha(k - 1) - \frac{(\alpha - 1)k + 1}{k}$$
$$= \alpha(k - 1)$$

Here, since k = n+1, in the case where the test sequence m is a multiple of the number of stages k of the register, the exponential part t of (1−2p) of each term becomes the same. This shows that in the case of p = 1, if α(k−1) is an even number, an error is missed.

In other words, if all of input data are erroneous (p = 1), the case where error missing takes place differs depending on the number of data inputs n. Specifically, in the case where n is an even number, error missing in the case of p = 1 takes place when the test sequence m is a multiple of n+1 = k (the case of m mod. k = 0), and in the case where n is an odd number, error missing in the case of p = 1 takes place when the test sequence m is double of (n+1) = k (the case of m mod 2 k = 0).

From the above, it is understood that the probability p of error contained in the test data to be input approaches $\frac{1}{2}^k$ asymptotically in a range of 0 < p < 1, and in the case of p = 1, it becomes 1/k.

Figure 5:
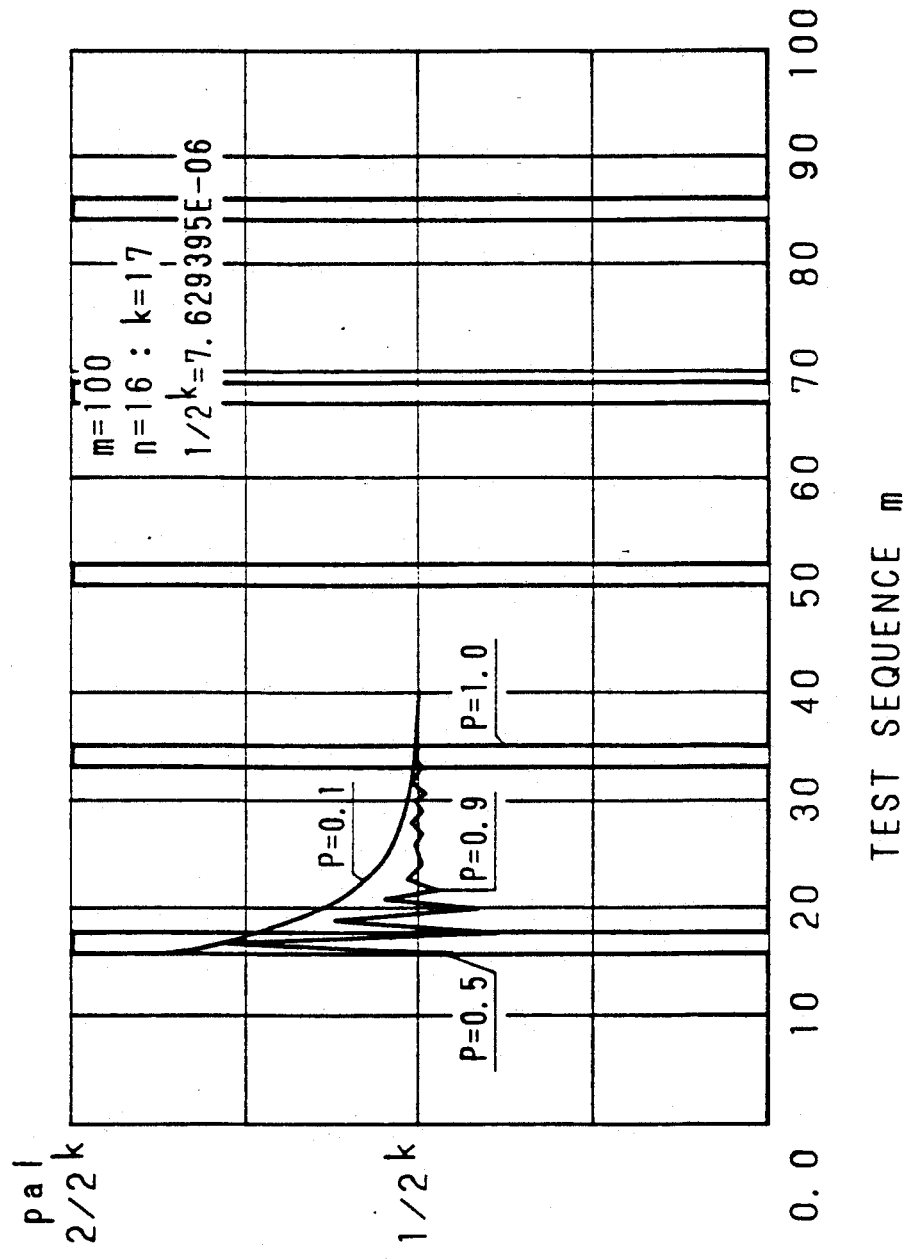
FIG. 5 is a graph showing the error missing rate when n is 16 and the number of registers is 17.

The graph in FIG. 5 shows the error missing probability versus the test sequence m of the multi-input signature register in the case of n = 16 and k = 17. Note that a region of m < k is not shown. From this graph in FIG. 5, the following is understood.

| | | |
|---|---|---|
| 0 < p < 0.5 | → | The missing probability Pal converges smoothly to $\frac{1}{2}^k$. |
| p = 0 | → | The missing probability Pal takes a value of $\frac{1}{2}^k$ from the beginning. |
| 0.5 < p < 1 | → | The missing probability Pal asymptotically approaches $\frac{1}{2}^k$ while oscillating. |
| p = 1 | → | The missing probability Pal becomes 1/k or $\frac{1}{2}^k$. |

As described above, the missing probability Pal converges to $\frac{1}{2}^k$ except for the case of p = 1. Also, since n is an even number, an error is missed when the test sequence m is a multiple of k (= 17), but an error is detected in the other cases. In other words, the missing probability Pal in the case of p = 1 becomes 1/k.

The above case is an example where the number of stages k of the register is larger than the number of bits n of the test data by only one, and next description is made of the case where k is larger than n by two, that is, the number of stages of the register is larger than the number of bits of the test data by two.

In addition, in such a case where the number of stages k of the register is larger than the number of bits n of the test data, each added register is operated as a shift register connected in series.

Figure 6:
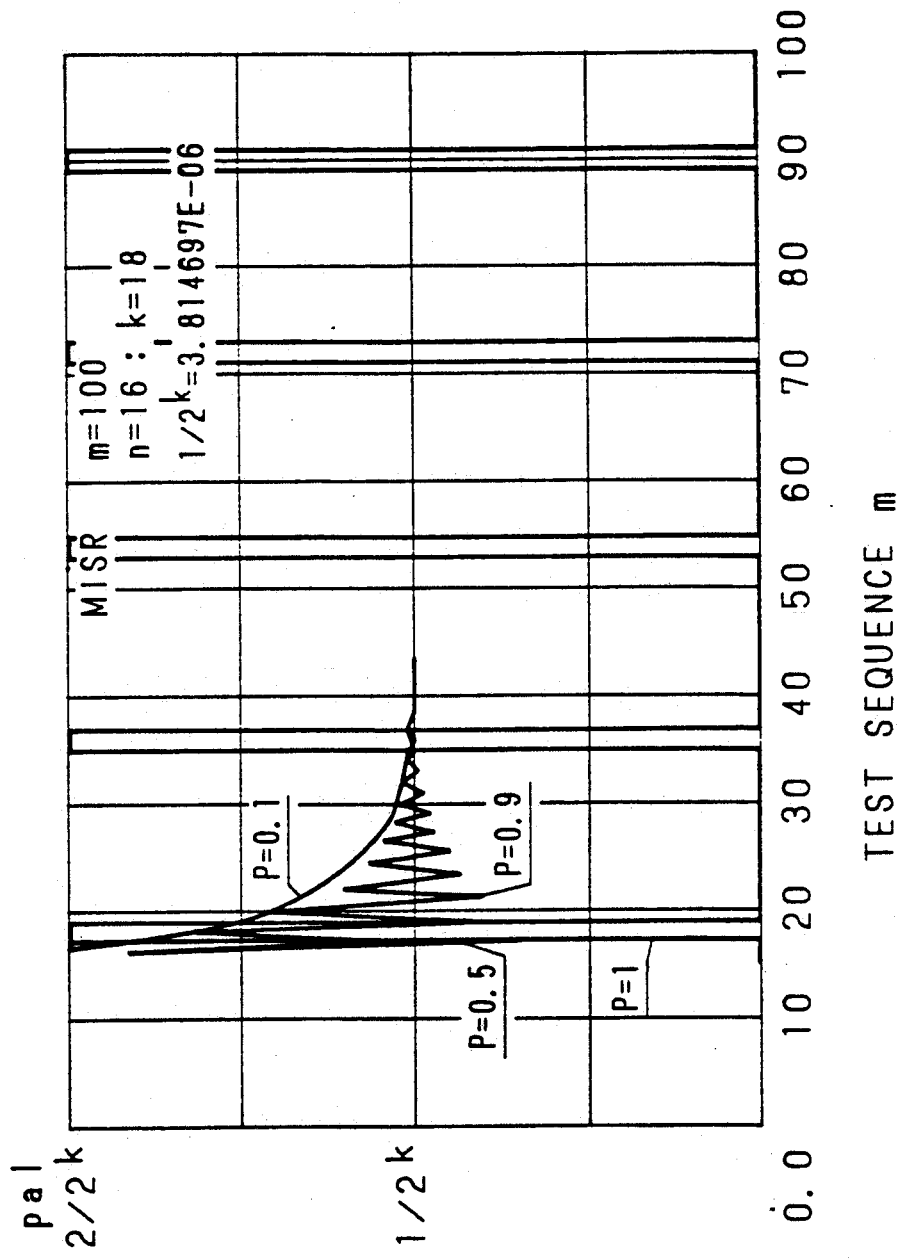
FIG. 6 is a graph showing the error missing rate when n is 16 and the number of registers is 18.
Figure 7:
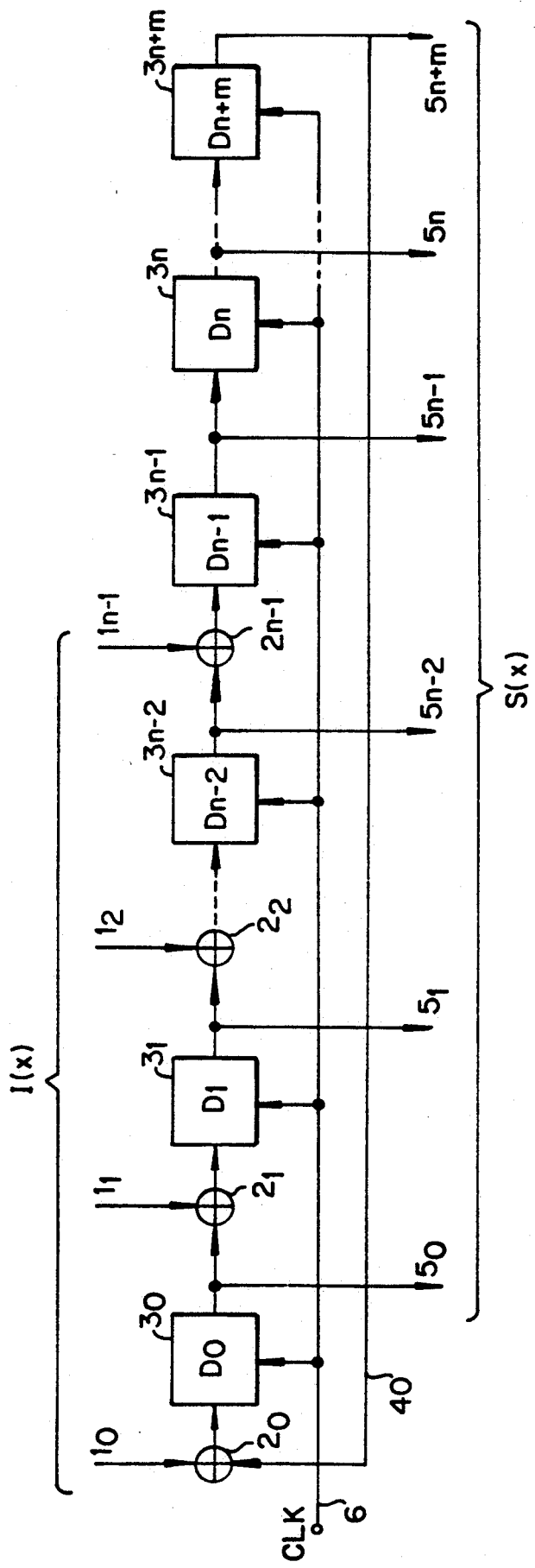
FIG. 7 is a circuit diagram showing a test circuit in accordance with the present invention having an additional register with a plurality of stages.

The graph in FIG. 6 shows a characteristic of the error missing probability versus the test sequence of the multi-input signature register in the case of n = 16 and K = 18. Note that a region of m < k is not shown.

The error missing probability Pal of the whole signature register in this case is given as a product of the error missing probabilities of the individual registers, being expressed by the following equation.

$$\begin{aligned}
Pal &= \text{(missing probability of +1 register)} \times \\
&\quad \text{(missing probability of +2 register)} \times \\
&\quad \text{(missing probability of 1 } - \text{ n registers) } - \\
&\quad (1 - p)^{mn} \\
&= \frac{1 + (1 - 2p)^{t2}}{2} \times \frac{1 + (1 - 2p)^{t3}}{2} \times \\
&\quad \frac{\pi}{\substack{j=1}}^{n} \frac{1 + (1 - 2p)^{t1}}{2} - (1 - p)^{\overline{mn}}
\end{aligned} \tag{13}$$

here,
- m: number of test vectors (sequence length of test data)
- n: number of inputs of signature register (width of test data)
- k: number of stages of signature register
- p: probability of error contained in test pattern Also, representing the exponential part of the numerator of Equation (13) by t, the following equations are obtained.

$$t_1 = m - \left[ \frac{m - j}{k} + \frac{m - j - 1}{k} \right] \tag{14}$$

$$t_2 = m - \left[ \frac{m + j}{k} + \frac{m}{k} - 1 \right] \tag{15}$$

$$t_3 = m - \left[ \frac{m}{k} + \frac{m - 1}{k} \right] \tag{16}$$

Next, in the case where the test sequence m is a multiple of the number of stages k of the register (m = αk), Equation (14) becomes as follows.

$j = 0$: register of 1

$$t_1 = m - \left[ \frac{m}{k} + \frac{m-1}{k} \right]$$
$$= \alpha k - (\alpha + \alpha)$$
$$= \alpha(k - 2)$$

$j = n(= k - 2)$: register of $n$ $$t_1 = m - \left[ \frac{m-k+2}{k} + \frac{m-k+1}{k} \right]$$
$$= \alpha(k - 2)$$

This means that the exponential parts of the first through the n-th registers become $\alpha(k-2)$.

Equation (15) of the exponential part of the +1 register becomes as follows.

$$t_2 = m - \left[ \frac{m+1}{k} + \frac{m}{k} - 1 \right]$$
$$= \alpha(k - 2)$$

Also, Equation (16) of the exponential part of the +2 register becomes as follows.

$$t_3 = m - \left[ \frac{m}{k} + \frac{m-1}{k} \right]$$
$$= \alpha(k - 2)$$

Accordingly, all of the exponential parts of the term $(1-2p)$ of k number of registers become $\alpha(k-2)$.

Here, the missing probability Pal in the case of $p=1$, in others words, in the case where all of the input data are erroneous becomes as follows, and an error is sometimes missed when $\alpha(k-2)$ is an even number.

$$Pal \propto \frac{1 + (1 - 2p)^t}{2}$$
$$= \frac{1 + (-1)^{\alpha(k-2)}}{2}$$

In other words, if all of the input data are erroneous ($p=1$), the case where error missing takes place differs depending on the number of data inputs.

Specifically, where n is an even number, error missing in the case of $p=1$ takes place when the test sequence m is a multiple of $n+2=k$ (in the case of m mod $k=0$), and when n is an odd number, error missing in the case of $p=1$ takes place when the test sequence m is double of $n+2=k$ (the case of m mod $2k=0$).

From the above, it is understood that when the probability p of error contained in the test data to be input is within a range of $0<p<1$, the error missing probability of this signature register asymptotically approaches $\frac{1}{2}^k$, and becomes $1/k$ in the case of $p=1$.

The graph in FIG. 6 shows a characteristic of the error missing probability versus test sequence m of the multi-input signature register in the case of $n=16$ and $k=18$. Note that a range of $m<k$ is not shown. From the graph in FIG. 6, the following is understood.

$0 < p < 0.5$ → The missing probability Pal con-

-continued

| | |
|---|---|
| | verges smoothly to $\frac{1}{2}^k$. |
| $p = 0$ | → The missing probability Pal takes a value of $\frac{1}{2}^k$ from the beginning. |
| $0.5 < p < 1$ | → The missing probability Pal asymptotically approaches $\frac{1}{2}^k$ while oscillating. |
| $p = 1$ | → The missing probability Pal becomes $1/k$ or $\frac{1}{2}^k$. |

As described above, the missing probability Pal converges to $\frac{1}{2}^k$ except for the case of $p=1$. Also, since n is an even number, when the test sequence m is a multiple of k (=18), an error is missed, but an error is detected in the other cases. In other words, the missing probability Pal in the case of $P=1$ becomes $1/k$.

In accordance with the test circuit of the present invention, an error detecting rate of the same degree as the case where the primitive polynomial is used is obtainable by configuring the signature register with registers whose number is larger than the width of the test data to be input even if the primitive polynomial is not used as a characteristic polynomial of the signature register, and only one feedback loop is required. Also, for the hardware configuration, only one auxiliary shift register having one or more register is added, and no additional exclusive-or elements are required for the auxillary shift register, therefore simplifying the actual circuit configuration and reducing the circuit occupying area on the chip.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds thereof, are therefore intended to be embraced by the claims.

What is claimed is:

1. In a test circuit having a signature register with a plurality of stages for receiving multi-bit data and performing a signature analysis, each stage having an exclusive-or input element for receiving one of the bits of the multi-bit data and a one bit storage element having a data input for receiving the output from the associated exclusive-or element, a data output and a clock input terminal coupled to a common clock source, the data output of each stage being coupled as an input to the exclusive-or element of the next succeeding stage, and means for providing a feedback path from at least some of the stages to the first stage of the signature register; the improvement comprising an additional register having a data input coupled to the output of the last signature register stage, a clock input coupled to the common clock source and an output coupled as the sole feedback term to the exclusive-or element associated to the first stage of the signature register.

2. The invention of claim 1 wherein said additional register comprises a single stage.

3. The invention of claim 1 wherein said additional register comprises a plurality of serially coupled stages, and wherein said additional register output comprises the output of the last stage in said additional register.

4. The invention of claim 1 wherein said signature register and said additional register comprise a portion of an integrated circuit with a signature to be analyzed.

5. A test circuit for performing a signature analysis of a digital circuit designed for operating on multi-bit input data, said test circuit comprising:

a first register having a plurality of individual serially coupled stages equal in number to the number of bits of the multi-bit data, each stage having an exclusive-or input element and an associated storage element, each exclusive-or input element having a first data input for receiving one of the bits of the multi-bit data, a second data input and a data output, each storage element having a data input coupled to the data output of the associated exclusive-or element, a clock input and a data output, the data output of the first through penultimate stages being coupled to the second data input of the exclusive-or input element of the next succeeding stage; and a second register having at least one stage including a storage element, said second register having a data input coupled to the data output of the last stage of said first register, a clock input and a data output coupled as the sole feedback term to the second data input of the exclusive-or input element associated with the first stage of said first register, whereby signature analysis can be performed by synchronously operating said first and second registers to succeesively conduct exclusive-or operations on the multi-bit data contained in said first and second registers and multi-bit data presented to the first data input of said exclusive-or elements.

6. The invention of claim 5 wherein said second register comprises a single stage.

7. The invention of claim 5 wherein said second register comprises a plurality of serially coupled stages, the output of said second register comprising the output of the last stage in said second register.

8. The invention of claim 5 wherein said first and second registers comprise a portion of an integrated circuit containing the digital circuit with a signature to be anlyzed.

* * * * *